(12) United States Patent
Ahladas et al.

(10) Patent No.: US 9,093,240 B2
(45) Date of Patent: Jul. 28, 2015

(54) DIRECT CURRENT GROUND FAULT INTERRUPTER

(71) Applicant: International Business Machines Corporation, Armonk, NY (US)

(72) Inventors: Steven John Ahladas, Highland, NY (US); Vincent P. Mulligan, Poughkeepsie, NY (US); Edward Joseph Seminaro, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 13/894,856

(22) Filed: May 15, 2013

(65) Prior Publication Data
US 2014/0340797 A1    Nov. 20, 2014

(51) Int. Cl.
*H02H 3/00* (2006.01)
*H01H 83/02* (2006.01)
(52) U.S. Cl.
CPC ..................................... *H01H 83/02* (2013.01)
(58) Field of Classification Search
CPC ..................................................... H02H 1/0015
USPC ............................................................ 361/42
See application file for complete search history.

(56) References Cited

U.S. PATENT DOCUMENTS

| | | | | |
|---|---|---|---|---|
| 3,631,321 | A * | 12/1971 | Eisenstadt | 361/20 |
| 4,371,832 | A * | 2/1983 | Wilson et al. | 324/509 |
| 6,678,132 | B1 * | 1/2004 | Carruthers et al. | 361/42 |
| 7,542,252 | B2 | 6/2009 | Chan et al. | |
| 7,978,089 | B2 | 7/2011 | Salgueiro et al. | |
| 8,355,226 | B2 | 1/2013 | Yoshida et al. | |
| 2010/0007999 | A1 | 1/2010 | Iwata | |
| 2012/0086458 | A1 | 4/2012 | Wei et al. | |
| 2012/0201059 | A1 | 8/2012 | Berggren et al. | |
| 2012/0286729 | A1 | 11/2012 | Yegin et al. | |

\* cited by examiner

*Primary Examiner* — Stephen W Jackson
(74) *Attorney, Agent, or Firm* — Garg Law Firm, PLLC; Rakesh Garg; Parashos T. Kalaitzis

(57) ABSTRACT

A method, system, and computer program product for detecting and interrupting a ground fault in a direct current (DC) power circuit are provided in the illustrative embodiments. A first value of a first current flow over a first part of the DC power circuit is compared with a second value of a second current flow over a second part of the DC power circuit. A voltage is generated, wherein the voltage is proportional to a difference between the first and the second values. Responsive to the voltage exceeding the threshold voltage for a threshold time, a signal output is produced, the signal configured to cause a short-circuit in the first part of the DC power circuit. The first part of the DC power circuit is interrupted responsive to the short-circuit.

20 Claims, 6 Drawing Sheets

DIRECT CURRENT GROUND FAULT INTERRUPTER

BACKGROUND

1. Technical Field

The present invention relates generally to a method, system, and computer program product for fault protection in power distribution circuits. More particularly, the present invention relates to a method, system, and computer program product for a direct current ground fault interrupter.

2. Description of the Related Art

Ground fault is an anomaly in an electrical power circuit whereby electricity travels to ground potential via an unintended route in the circuit. For example, a short circuit causes electricity to travel to ground by bypassing some or all portions of an appliance powered by the electricity.

As an example, water often provides such an unintended path for electricity. Presence of water near electrical circuits is therefore hazardous. Many high-performance computing systems (HPC systems) use liquid cooling for dissipating the heat generated in those systems. The liquid coolant is often water, a mixture of water and some compound, or a coolant. Regardless of the type of liquid coolant used, the coolant circulates in close proximity with electrical components within the systems, and poses a ground fault hazard.

SUMMARY

The illustrative embodiments provide a method, system, and computer program product for a direct current ground fault interrupter. An embodiment compares a first value of a first current flow over a first part of the DC power circuit with a second value of a second current flow over a second part of the DC power circuit. The embodiment generates a voltage, wherein the voltage is proportional to a difference between the first and the second values. The embodiment outputs, responsive to the voltage exceeding the threshold voltage for a threshold time, a signal, the signal configured to cause a short-circuit in the first part of the DC power circuit. The embodiment interrupts the first part of the DC power circuit responsive to the short-circuit.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description when read in conjunction with the accompanying drawings, wherein:

DETAILED DESCRIPTION

Figure 1:
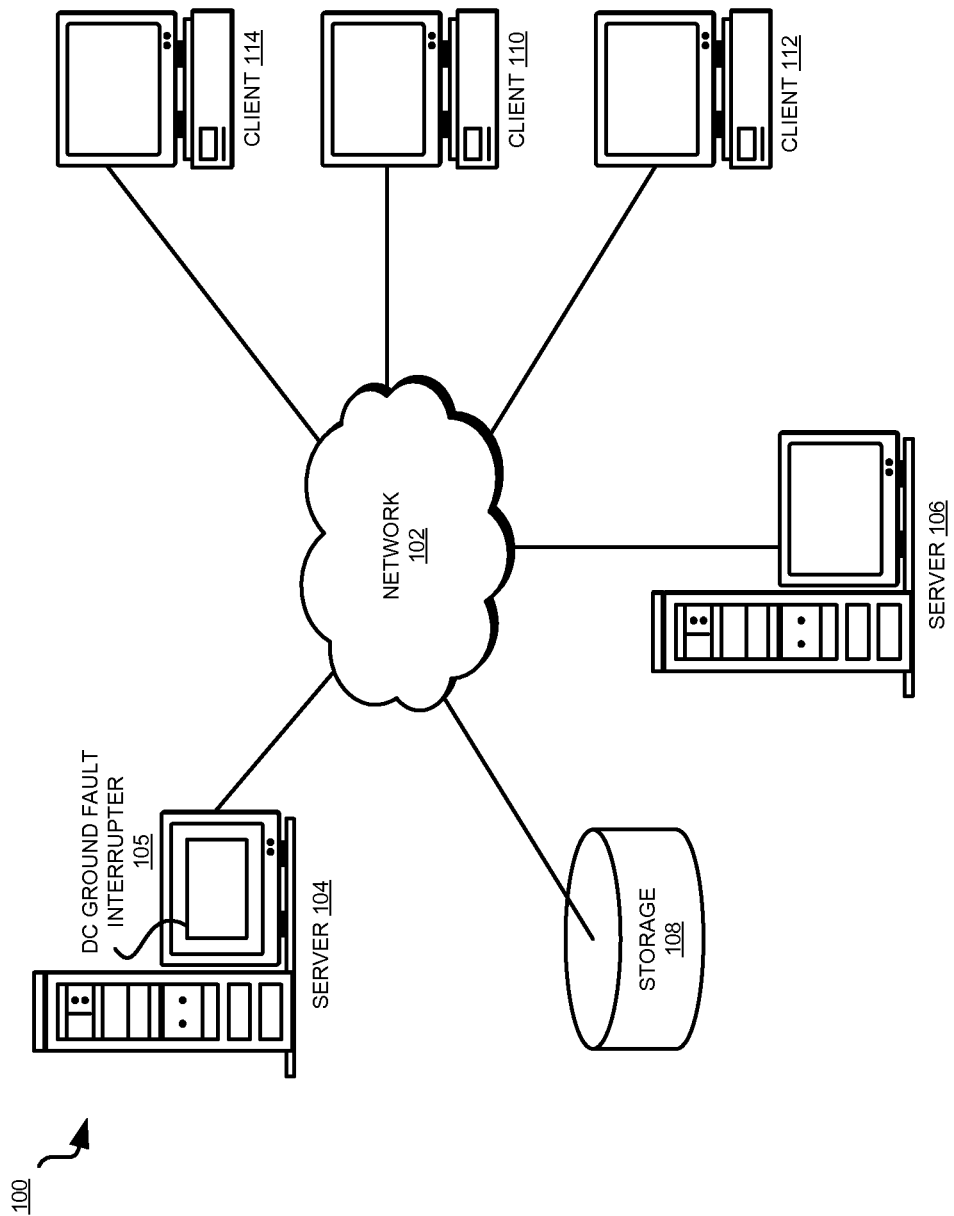
FIG. 1 depicts a block diagram of a network of data processing systems in which illustrative embodiments may be implemented.

Presently available ground fault interrupters operate on alternating current power (AC power) circuits. The illustrative embodiments recognize that many computing systems, such as HPC systems, operate using direct current power (DC power). For example, some HPC systems use 360 Volt DC power supply to power the components therein and operate the system.

The illustrative embodiments recognize that presently available ground fault interrupters are unsuitable for DC power application. For example, an AC ground fault interrupter cannot be used to detect a ground fault in a DC circuit, such as in a liquid-cooled HPC system.

The illustrative embodiments used to describe the invention generally address and solve the above-described problems and other problems related to the detecting and interrupting faults in DC power circuits. The illustrative embodiments provide a method, system, and computer program product for a direct current ground fault interrupter.

The illustrative embodiments are described with respect to certain systems, components, thresholds, and types of faults only as examples. Such descriptions are not intended to be limiting to the invention.

Furthermore, while some embodiments are described with respect to a hardware circuit, those of ordinary skill in the art will be able to implement all or parts of an embodiment in software that uses data and executes using a processor and a memory. Accordingly, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, components, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1, this figure is an example diagram of a data processing environment in which illustrative embodiments may be implemented. FIG. 1 is only an example and is not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, DC ground fault interrupter (DC GFI) 105 in server 104 is an implementation of an embodiment described herein. In one embodiment, DC GFI 105 comprises hardware components in a hardware circuit. In another embodiment, a portion of DC GFI 105 is implemented in software, which can be executed using a processor and a memory associated with server 104 or another data processing system. In one embodiment, DC GFI 105 operates within server 104. In another embodiment, DC GFI 105 operates external to server 104 and in conjunction with server 104's power circuit. In one embodiment, server 104 is liquid-cooled HPC system. In another embodiment, server 104 can be replaced with any other DC power appliance or system, operating in a configuration as shown in FIG. 1 or another suitable configuration according to the nature of that DC power appliance.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 2:
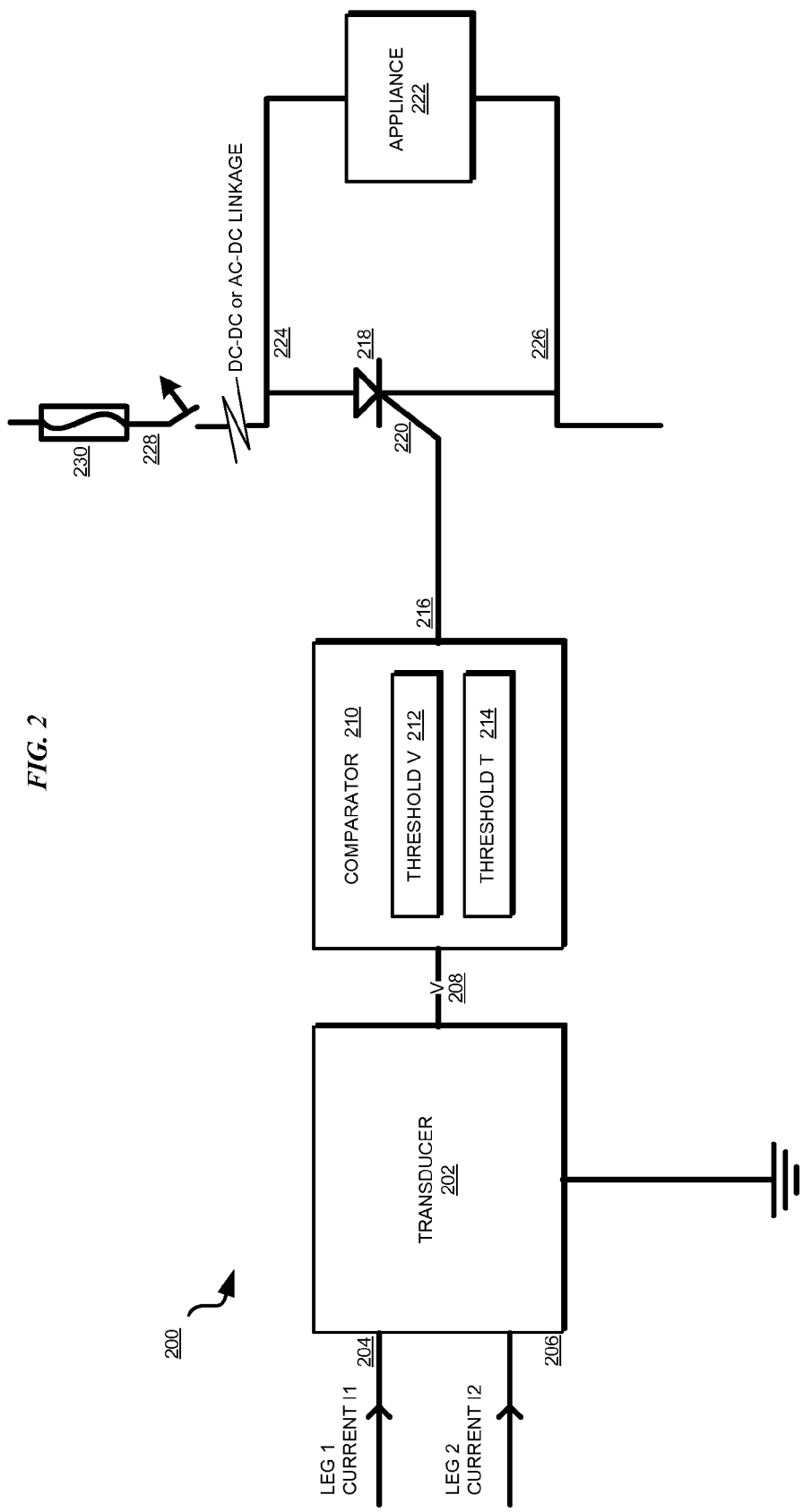
FIG. 2 depicts a block diagram of a direct current ground fault interrupter configuration in accordance with an illustrative embodiment.

With reference to FIG. 2, this figure depicts a block diagram of a direct current ground fault interrupter configuration in accordance with an illustrative embodiment. Configuration 200 can be implemented as DC GFI 105 in FIG. 1.

Configuration 200 includes transducer 202. Transducer 202 receives as input two current values 204 and 206 labeled "I1" and "I2", respectively. For example, in one embodiment, input 204 is an electrical current carried over a first leg of a power circuit, and input 206 is an electrical current carried over a second leg of the power circuit. For example, a power supply or a power distribution unit associated with a data processing environment may supply different data processing system components, different data processing systems, different appliances, and other different electrical power consuming devices.

In another embodiment, input 204 may be data representing the electrical current carried over a first leg of the power circuit, and input 206 may be data representing the electrical current carried over a second leg of the power circuit. Another component, such as a meter, can measure the electrical currents, generate the data representing the current values, and send as inputs 204 and 206 to transducer 202. In such an embodiment, transducer 202 may take a different form than an electrical transducer and such form is contemplated within the scope of the illustrative embodiments.

Transducer 202 outputs voltage value 208. Output 208 is proportional to the difference between inputs 204 and 206. In one embodiment, output 208 is an electrical voltage. In another embodiment, output 208 is data representative of a voltage value. Only for the clarity of the description, and not to discard the embodiments where the inputs and output are data, inputs 204 and 206 are referred to as currents and output 208 is referred to as voltage.

In case of a ground fault at a component that receives electrical power from one of the two legs that provide inputs 204 and 206, the electrical current in that leg will rise. Depending on the nature of the ground fault, the rise in the current can be abrupt and sharp, for example, when a live current carrying wire or connector comes in contact with liquid. In such circumstances, the current can more than double in a matter of a few microseconds in that leg. Depending on the nature of the ground fault, the rise in the current can be gradual and not as pronounced, for example, when humidity rises in the air between a live current carrying wire or connector and a liquid surface, causing the dielectric value of the air insulation to drop and leakage ground current to increase. In such circumstances, the current can increase twenty to eighty percent over a few seconds or minutes.

When the current in one leg increases, the difference between the current values in the two legs also increases. Correspondingly, the difference between currents 204 and 206 increases, causing voltage 208 to increase.

Voltage 208, or data corresponding to voltage 208, is supplied to comparator 210. Comparator 210 compares voltage 208 to voltage threshold 212. When comparator 210 determines that voltage 208 has exceeded voltage threshold 212 for longer than time threshold 214, comparator 210 produces output 216.

Time threshold 214 is tunable, such as by varying the component values in a resistor-capacitor circuit (RC circuit). Determining whether voltage 208 exceeds voltage threshold 212 for greater than time threshold 214 allows configuration 200 to absorb noise-related spikes and other transient spikes in voltage 208 which are normally not related to a ground fault. A rise in voltage 208 due to ground fault does not subside as quickly as an electromagnetic noise-related voltage spike.

Most AC circuit breakers require a very large change in current, such as more than doubling of the current to interrupt the circuit. Furthermore, most AC breakers also allow that increased current to persist for a relatively long time, on the order of milliseconds, before they interrupt the circuit. The illustrative embodiments recognize that even if some AC ground fault interruption mechanism were configured to operate in a DC power system, without the benefit of an embodiment, such configuration would allow high current to persist for too long to risk component damage in high performance computing systems.

In one example embodiment, time threshold 214 is set to fifty microseconds. In one embodiment, voltage threshold 212 is set to a predetermined value, for example, only twenty percent above a predetermined expected difference between currents 204 and 206. In another embodiment, voltage threshold 212 is set to a predetermined percentage of an average value of voltage 208 over past predetermined period, for example, to one hundred fifty percent of the average value of voltage 208 over past ten seconds.

Comparator 210 can be configured as hardware or software, or a combination thereof. Output 216 can be a voltage, or data corresponding to a voltage that another component (not shown) can translate into a voltage. Only for the clarity of the description, and without implying a limitation, output 216 is treated as voltage, regardless whether comparator 210 itself generates the electrical voltage or another component generates the electrical voltage corresponding to output data 216 from comparator 210.

Voltage 216 is supplied to semiconductor-controlled-rectifier (SCR), or thyristor, 218, as gate voltage at gate 220. As is known to those of ordinary skill in the art, SCR 218 operates as a normally open switch, absent a potential at gate 220, and as a conductor when a suitable potential level is applied to gate 220. Depending on the specifications of SCR 218, comparator 210 provides voltage 216 sufficient to operate SCR 218 as a conductor.

Appliance 222 is any suitable component, appliance, device, or system that consumes DC power from the one or more legs on which the ground fault is being detected. Conductors 224 and 226 provide appliance 222 DC electrical power. SCR 218 operates as a normally open switch between conductors 224 and 226.

When voltage 216 is applied to gate 220, SCR 218 operates to create a short-circuit between conductors 224 and 226. Circuit breaker 228 can be a circuit breaker that operates on the AC side of the DC power circuit feeding conductors 224 and 226, or can be a DC circuit breaker that operates on a DC power circuit feeding conductors 224 and 226. Circuit breaker 228 trips or interrupts the current flow in conductors 224, 226, or both, resulting from the short-circuit due to SCR 218 operating as a conductor. If, for some reason, such as when circuit breaker 228 fails to operate, or operates too slowly, or requires a certain current flow to operate and that current flow is not achieved by the short-circuit, fuse 230 can operate to disconnect the flow of electricity to conductor 224, 226, or both.

In one embodiment, a solid-state circuit breaker used as circuit breaker 228 is preferred. Solid-state circuit breakers generally have a better response time than commonly used AC circuit breakers whose response time is of the order of milliseconds. While solid-state circuit breakers still do not achieve response times approximating time threshold 214, a solid-state circuit breaker operating in conjunction with an embodiment, such as in position 228, will improve the overall response time of ground fault interruption in a DC circuit. Furthermore, an embodiment enables any circuit breaker in position 228 to respond to a ground fault current increase much smaller than the threshold current normally required to trip that circuit breaker.

Note that voltage 216, SCR 218, and gate 220 are described only as examples and not as limitations on the illustrative embodiments. For example voltage 216 is essentially a signal configured to operate a switch, of which SCR 218 is an example. Those of ordinary skill in the art will be able to generate other signals, such as a waveform, a current flow, a bias, or another suitable signal, to trigger another type of switch, including other types of SCRs, and such signals, triggers, switches are contemplated within the scope of the illustrative embodiments.

Figure 3:
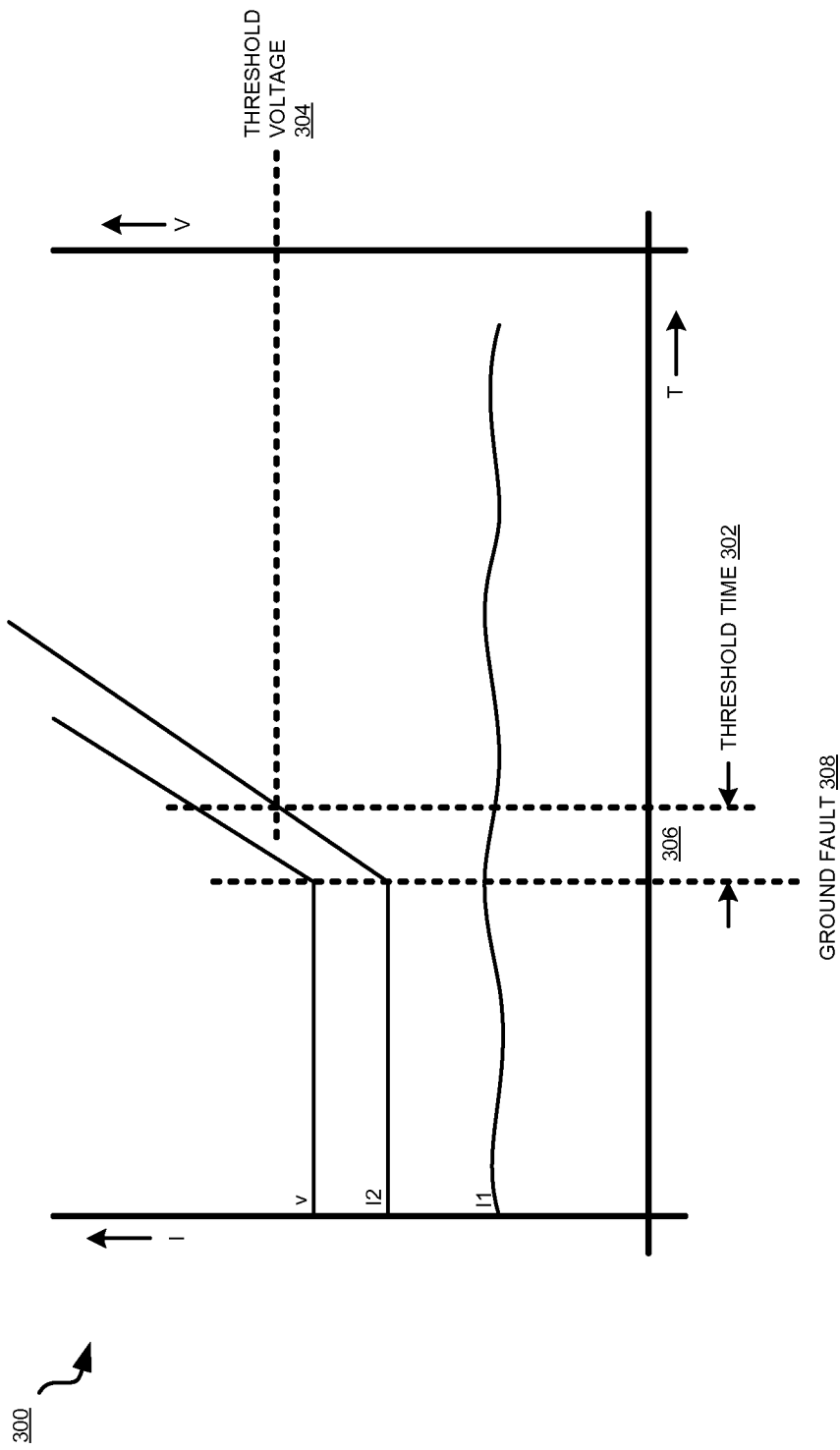
FIG. 3 depicts a graph of currents, voltage and thresholds in a direct current ground fault interrupter configuration in accordance with an illustrative embodiments.

With reference to FIG. 3, this figure depicts a graph of currents, voltage and thresholds in a direct current ground fault interrupter configuration in accordance with an illustrative embodiments. Currents I1 and I2 in graph 300 correspond to input currents 204 and 206 in FIG. 2. Voltage V corresponds to output voltage 208 in FIG. 2. Threshold time 302 corresponds to threshold time 214, and threshold voltage 304 corresponds to threshold voltage 212 in FIG. 2, respectively.

Currents I1 and I2 have values before time 306 as shown in graph 300. Corresponding voltage V up to time 306 corresponds to the difference between I1 and I2 up to time 306 as shown.

Ground fault 308 occurs at time 306. Upon passage of threshold time 302, voltage V has either remained at, or exceeded, voltage threshold 304, indicating that the source of the elevated current difference, and therefore of elevated voltage V, is ground fault 308, and not noise or a transient change in the power draw.

Figure 4:
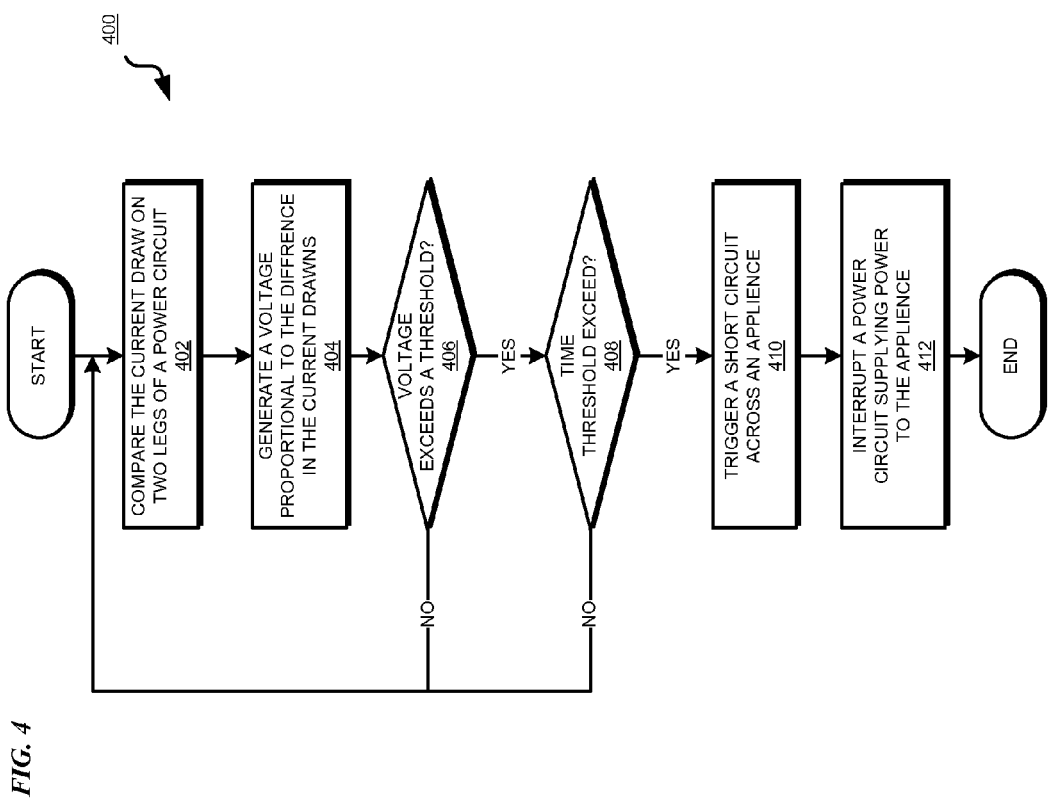
FIG. 4 depicts a flowchart of a process for ground fault interruption in a DC power circuit in accordance with an illustrative embodiment.

With reference to FIG. 4, this figure depicts a flowchart of a process for ground fault interruption in a DC power circuit in accordance with an illustrative embodiment. Process 400 can be implemented in a direct current ground fault interrupter configuration, such as configuration 200 in FIG. 2.

Process 400 begins by comparing the current draws on two legs of a power circuit (step 402). An embodiment can be configured to compare the current draws on more than two legs of a DC power circuit within in the scope of the illustrative embodiments.

Process 400 generates a voltage that is proportional to the difference in the current draws in the at least two legs (step 404). Process 400 determines whether the voltage exceeds a threshold voltage (step 406). If the voltage does not exceed the voltage threshold ("No" path of step 406), process 400 returns to step 402. If the voltage exceeds the voltage threshold ("Yes" path of step 406), process 400 determines whether a time threshold is also exceeded while the voltage threshold is exceeded (step 408).

If the time threshold is not exceeded while the voltage threshold is exceeded, such as when the voltage subsides below the voltage threshold before the time threshold is exceeded, ("No" path of step 408), process 400 returns to step 402. If the time threshold is exceeded while the voltage threshold is exceeded, such as when the voltage remains above the voltage threshold and the time threshold is exceeded, ("Yes" path of step 408), process 400 triggers a short-circuit across an appliance (step 410). The appliance is any appliance, such as, but not limited to, a motor drive adapter, drawing DC power from the one or more legs in which the ground fault occurs.

Process 400 interrupts the DC power circuit that is supplying the DC power to the appliance (step 412). Process 400 ends thereafter.

Figure 5:
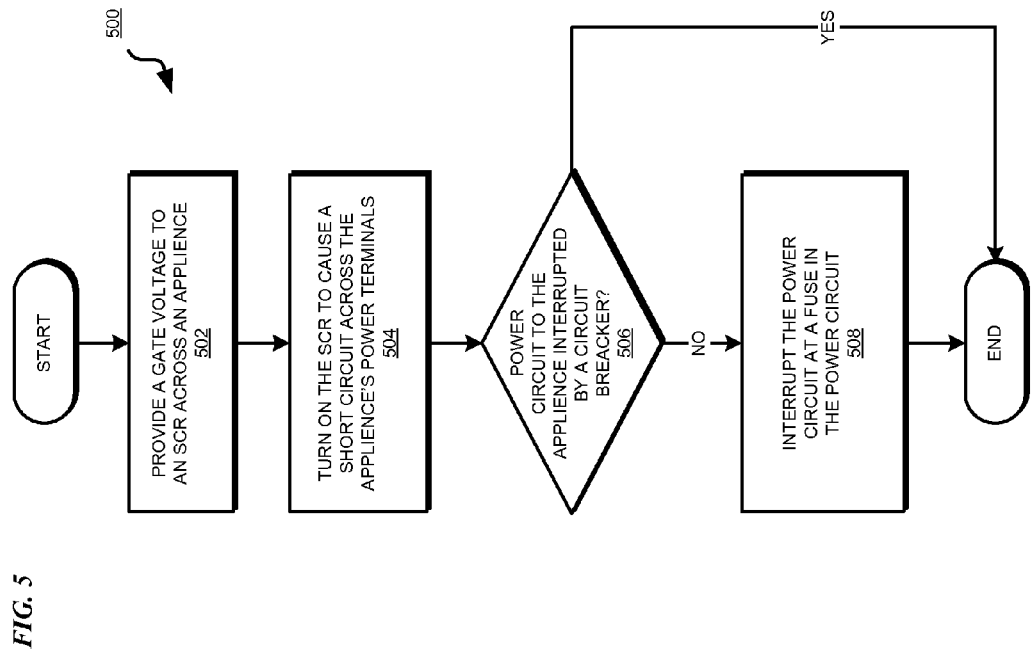
FIG. 5 depicts a flowchart of an example process for interrupting a DC power circuit upon detection of a ground fault in that DC power circuit in accordance with an illustrative embodiment.

With reference to FIG. 5, this figure depicts a flowchart of an example process for interrupting a DC power circuit upon detection of a ground fault in that DC power circuit in accordance with an illustrative embodiment. Process 500 can be implemented in steps 410 and 412 in FIG. 4.

Process 500 begins by providing a gate voltage to an SCR across an appliance that is drawing DC power from the DC power circuit where a ground fault has been detected (step 502). Process 500 turns on the SCR to cause a short-circuit across the appliance's power terminals (step 504).

Process 500 determines whether the power circuit supplying DC power to the appliance has been interrupted by a circuit breaker (step 506). If the power circuit supplying DC power to the appliance has been interrupted by a circuit breaker ("Yes" path of step 506), process 500 ends thereafter. If the power circuit supplying DC power to the appliance has not been interrupted by a circuit breaker ("No" path of step 506), process 500 interrupts the DC power circuit at a fuse in the power circuit (step 508). Process 500 ends thereafter.

Figure 6:
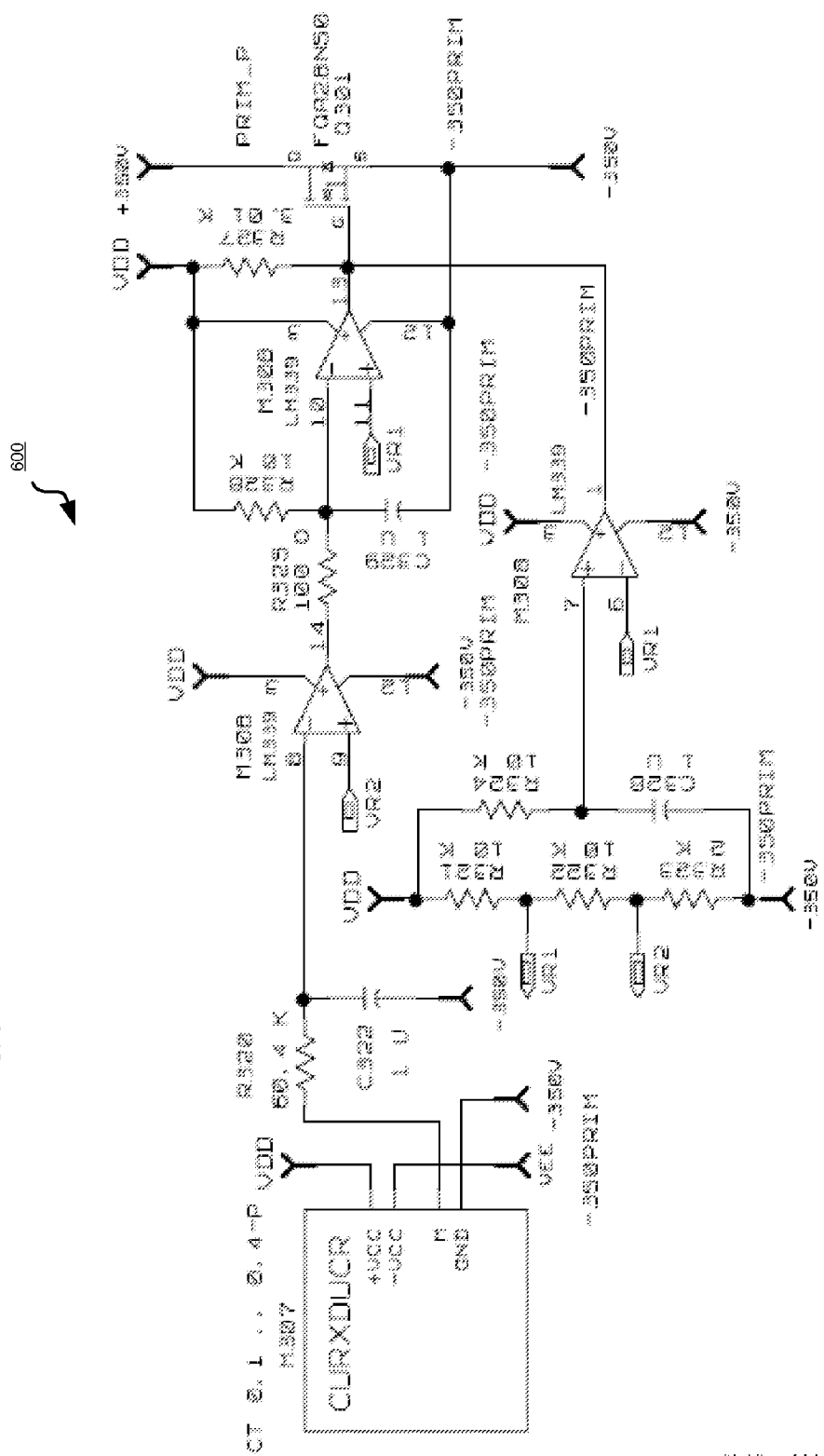
FIG. 6 depicts an example implementation of a direct current ground fault interrupter configuration in accordance with an illustrative embodiment.

With reference to FIG. 6, this figure depicts an example implementation of a direct current ground fault interrupter configuration in accordance with an illustrative embodiment. Circuit 600 implements the block diagram configuration 200 of FIG. 2 in a power circuit that operates on 360 V DC.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for a direct current ground fault interrupter. An embodiment enables the detection and interruption of ground faults in DC power circuits. The ground faults detected and interrupted by an embodiment can be so small as to not trigger a presently available circuit breaker. The ground faults can be detected and interrupted by an embodiment much faster than a circuit breaker can respond to a fault without the benefit of the embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for detecting and interrupting a ground fault in a direct current (DC) power circuit, the method comprising:
   comparing a first value of a first current flow over a first part of the DC power circuit with a second value of a second current flow over a second part of the DC power circuit;
   generating a voltage, wherein the voltage is proportional to a difference between the first and the second values;
   outputting, responsive to the voltage exceeding the threshold voltage for a threshold time, a signal, the signal configured to cause a short-circuit in the first part of the DC power circuit; and
   interrupting the first part of the DC power circuit responsive to the short-circuit.

2. The method of claim 1, wherein the comparing is performed by a comparator device comprising an electronic transducer.

3. The method of claim 1, further comprising:
   comparing the first value of the first current flow over the first part of the DC power circuit with a third value of a third current flow over a third part of the DC power circuit.

4. The method of claim 1, wherein the generating comprises:
   outputting a voltage value corresponding to the voltage; and
   generating the voltage at a device that receives the voltage value.

5. The method of claim 1, wherein the signal is a gate voltage, wherein the gate voltage is applied to a gate terminal of a semiconductor-controlled-rectifier (SCR), wherein the SCR becomes conductive upon applying the gate voltage.

6. The method of claim 1, further comprising:
   determining whether the voltage exceeds the threshold voltage for the threshold time; and
   preventing the outputting responsive to the voltage not exceeding the threshold voltage for the threshold time.

7. The method of claim 1, wherein the short-circuit occurs across a pair of terminals of an appliance receiving DC power from the first part of the DC power circuit.

8. The method of claim 7, wherein the appliance is a motor drive adapter.

9. The method of claim 1, wherein the interrupting uses a circuit breaker, wherein a current required to trip the circuit breaker exceeds a current draw added to the first part of the DC power circuit by the ground fault.

10. The method of claim 1, wherein the interrupting uses a circuit breaker, wherein a time required to trip the circuit breaker exceeds the threshold time.

11. A computer usable program product comprising a computer usable storage device including computer usable code for detecting and interrupting a ground fault in a direct current (DC) power circuit, the computer usable code comprising:
    computer usable code for comparing a first value of a first current flow over a first part of the DC power circuit with a second value of a second current flow over a second part of the DC power circuit;
    computer usable code for generating a voltage, wherein the voltage is proportional to a difference between the first and the second values;
    computer usable code for outputting, responsive to the voltage exceeding the threshold voltage for a threshold time, a signal, the signal configured to cause a short-circuit in the first part of the DC power circuit; and
    computer usable code for interrupting the first part of the DC power circuit responsive to the short-circuit.

12. The computer usable program product of claim 11, wherein the comparing is performed by a comparator device comprising an electronic transducer.

13. The computer usable program product of claim 11, further comprising:
    computer usable code for comparing the first value of the first current flow over the first part of the DC power circuit with a third value of a third current flow over a third part of the DC power circuit.

14. The computer usable program product of claim 11, wherein the generating comprises:
    computer usable code for outputting a voltage value corresponding to the voltage; and
    computer usable code for generating the voltage at a device that receives the voltage value.

15. The computer usable program product of claim 11, wherein the signal is a gate voltage, wherein the gate voltage is applied to a gate terminal of a semiconductor-controlled-rectifier (SCR), wherein the SCR becomes conductive upon applying the gate voltage.

16. The computer usable program product of claim 11, further comprising:
   computer usable code for determining whether the voltage exceeds the threshold voltage for the threshold time; and
   computer usable code for preventing the outputting responsive to the voltage not exceeding the threshold voltage for the threshold time.

17. The computer usable program product of claim 11, wherein the short-circuit occurs across a pair of terminals of an appliance receiving DC power from the first part of the DC power circuit.

18. The computer usable program product of claim 11, wherein the computer usable code is stored in a computer readable storage medium in a data processing system, and wherein the computer usable code is transferred over a network from a remote data processing system.

19. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

20. A data processing system for detecting and interrupting a ground fault in a direct current (DC) power circuit, the data processing system comprising:
   a storage device including a storage medium, wherein the storage device stores computer usable program code; and
   a processor, wherein the processor executes the computer usable program code, and wherein the computer usable program code comprises:
   computer usable code for comparing a first value of a first current flow over a first part of the DC power circuit with a second value of a second current flow over a second part of the DC power circuit;
   computer usable code for generating a voltage, wherein the voltage is proportional to a difference between the first and the second values;
   computer usable code for outputting, responsive to the voltage exceeding the threshold voltage for a threshold time, a signal, the signal configured to cause a short-circuit in the first part of the DC power circuit; and
   computer usable code for interrupting the first part of the DC power circuit responsive to the short-circuit.

* * * * *